US011870515B2

(12) United States Patent
Sung

(10) Patent No.: US 11,870,515 B2
(45) Date of Patent: *Jan. 9, 2024

(54) PRIORITY-BASED MU-MIMO PAIRING THRESHOLD FOR CODEBOOK BEAMFORMING IN 5G NR MASSIVE MIMO SYSTEMS

(71) Applicant: T-MOBILE INNOVATIONS LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,453

(22) Filed: Nov. 22, 2022

(65) Prior Publication Data

US 2023/0208478 A1 Jun. 29, 2023

Related U.S. Application Data

(63) Continuation of application No. 17/564,715, filed on Dec. 29, 2021, now Pat. No. 11,558,089.

(51) Int. Cl.
*H04B 7/0452* (2017.01)
*H04W 28/24* (2009.01)
(Continued)

(52) U.S. Cl.
CPC ........... *H04B 7/0452* (2013.01); *H04B 7/043* (2013.01); *H04B 7/0408* (2013.01); *H04B 7/0456* (2013.01); *H04B 7/0491* (2013.01); *H04B 7/0617* (2013.01); *H04W 28/24* (2013.01); *H04W 72/046* (2013.01);
(Continued)

(58) Field of Classification Search
CPC .... H04B 7/0452; H04B 7/0408; H04B 7/043; H04B 7/0456; H04B 7/0491; H04B 7/0617; H04B 7/0695; H04W 28/24; H04W 72/046; H04W 72/121; H04W 72/1273; H04W 72/566; H04W 72/0453
See application file for complete search history.

(56) References Cited

U.S. PATENT DOCUMENTS

| 10,044,426 B1 | 8/2018 | Pawar et al. |
| 2009/0323773 A1 | 12/2009 | Bala et al. |
| 2013/0242797 A1 | 9/2013 | Miyata |

OTHER PUBLICATIONS

Notice of Allowance dated Sep. 19, 2022 in U.S. Appl. No. 17/564,715, 9 pages.

*Primary Examiner* — Vineeta S Panwalkar
(74) *Attorney, Agent, or Firm* — SHOOK, HARDY & BACON L.L.P.

(57) ABSTRACT

Methods, media, and systems are provided for a priority-based multi-user (MU) multiple-input multiple-output (MIMO) pairing threshold for codebook beamforming. The methods, media, and systems identify a plurality of user device candidates for a user device pairing. A first user device of the plurality of user device candidates having a higher priority than another user device of the plurality of user device candidates is identified. Correlations between one or more beams associated with one or more of the plurality of user device candidates are determined. Based on determining the correlations, user devices can be paired for resource sharing. In some embodiments, the user devices are paired based on beam correlations being below a threshold. For example, the threshold can be determined based on a priority of one or more of the user devices.

20 Claims, 8 Drawing Sheets

(51) Int. Cl.
*H04B 7/0408* (2017.01)
*H04B 7/0426* (2017.01)
*H04B 7/0456* (2017.01)
*H04B 7/06* (2006.01)
*H04W 72/044* (2023.01)
*H04W 72/121* (2023.01)
*H04W 72/1273* (2023.01)
*H04B 7/0491* (2017.01)
*H04W 72/566* (2023.01)
*H04W 72/0453* (2023.01)

(52) U.S. Cl.
CPC ..... *H04W 72/121* (2013.01); *H04W 72/1273* (2013.01); *H04W 72/566* (2023.01); *H04W 72/0453* (2013.01)

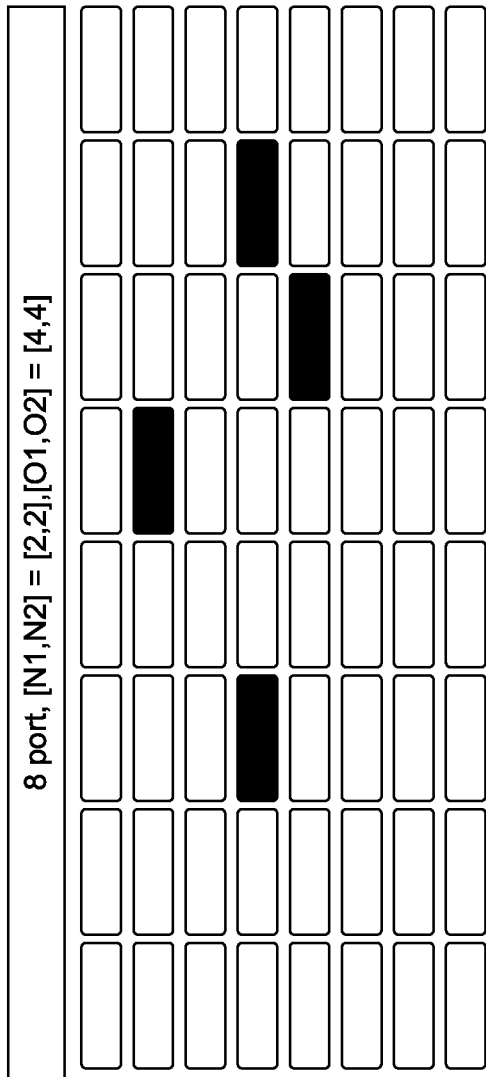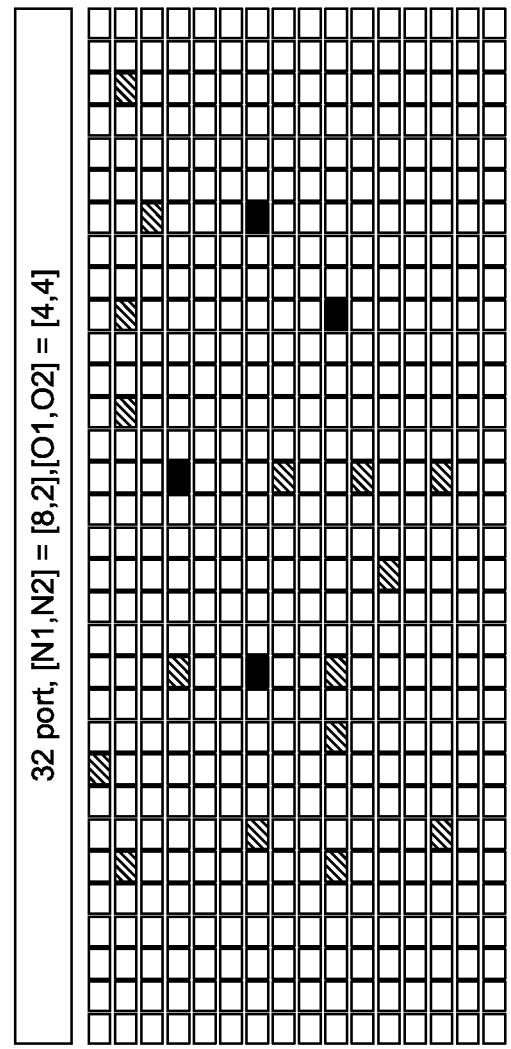
FIG. 4A.
FIG. 4B.

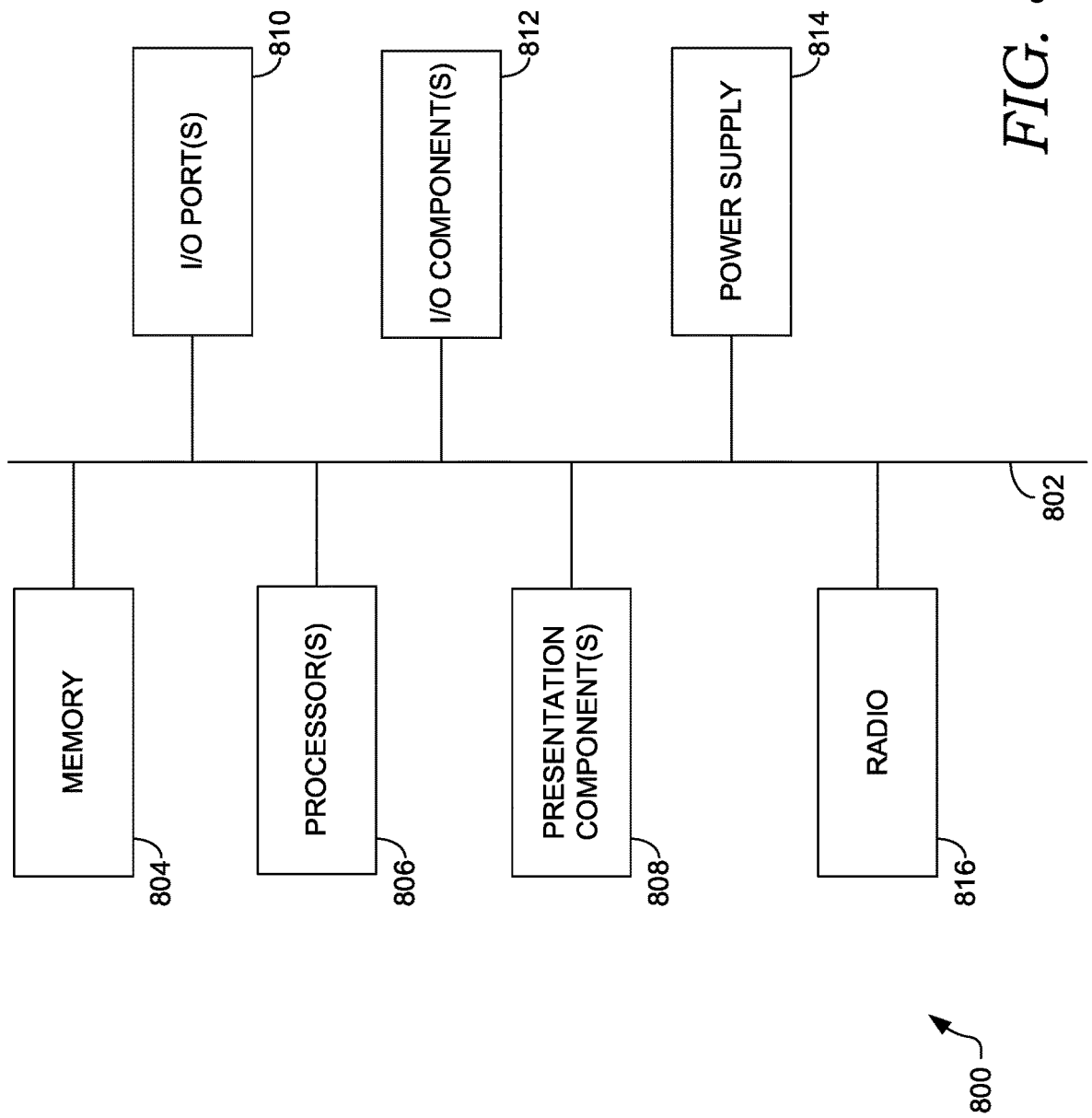

PRIORITY-BASED MU-MIMO PAIRING THRESHOLD FOR CODEBOOK BEAMFORMING IN 5G NR MASSIVE MIMO SYSTEMS

CROSS-REFERENCE TO RELATED APPLICATIONS

This application is a continuation of and claims priority to U.S. application Ser. No. 17/564,715; filed Dec. 29, 2021; and titled "PRIORITY-BASED MU-MIMO PAIRING THRESHOLD FOR CODEBOOK BEAMFORMING IN 5G NR MASSIVE MIMO SYSTEMS." The entirety of which is incorporated herein by reference.

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for a priority-based multi-user multiple-input multiple-output pairing threshold for codebook beamforming, substantially as shown in and/or described in connection with at least one of the figures, and as set forth more completely in the claims.

In aspects set forth herein, and at a high level, the systems and methods identify a user device having a first priority and a second user device. In aspects, the first priority may be a predetermined priority. Further, a correlation between a first beam corresponding to the user device and a second beam corresponding to the second user device is determined to be below a threshold. The threshold may be determined based on the first priority of the user device. For example, the threshold of a user device having a high-level priority may have a lower value threshold than the threshold of a user device having a lower level priority. Upon determining that the correlation is below the threshold, the user device is paired with the second user device for sharing a resource. For example, the resource may include a resource block. In some aspects, an uplink or downlink resource is scheduled for the pairing. Upon pairing the user device and the second user device, the first priority of the user device may be dynamically changed based on a change to a radio frequency measurement associated with the user device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIGS. 4A and 4B depict two example codebook designs to support a beamforming mechanism, in accordance with aspects herein;

FIG. 8 depicts an exemplary computing environment suitable for use in implementations of the present disclosure, in accordance with aspects herein.

DETAILED DESCRIPTION

Figure 1:
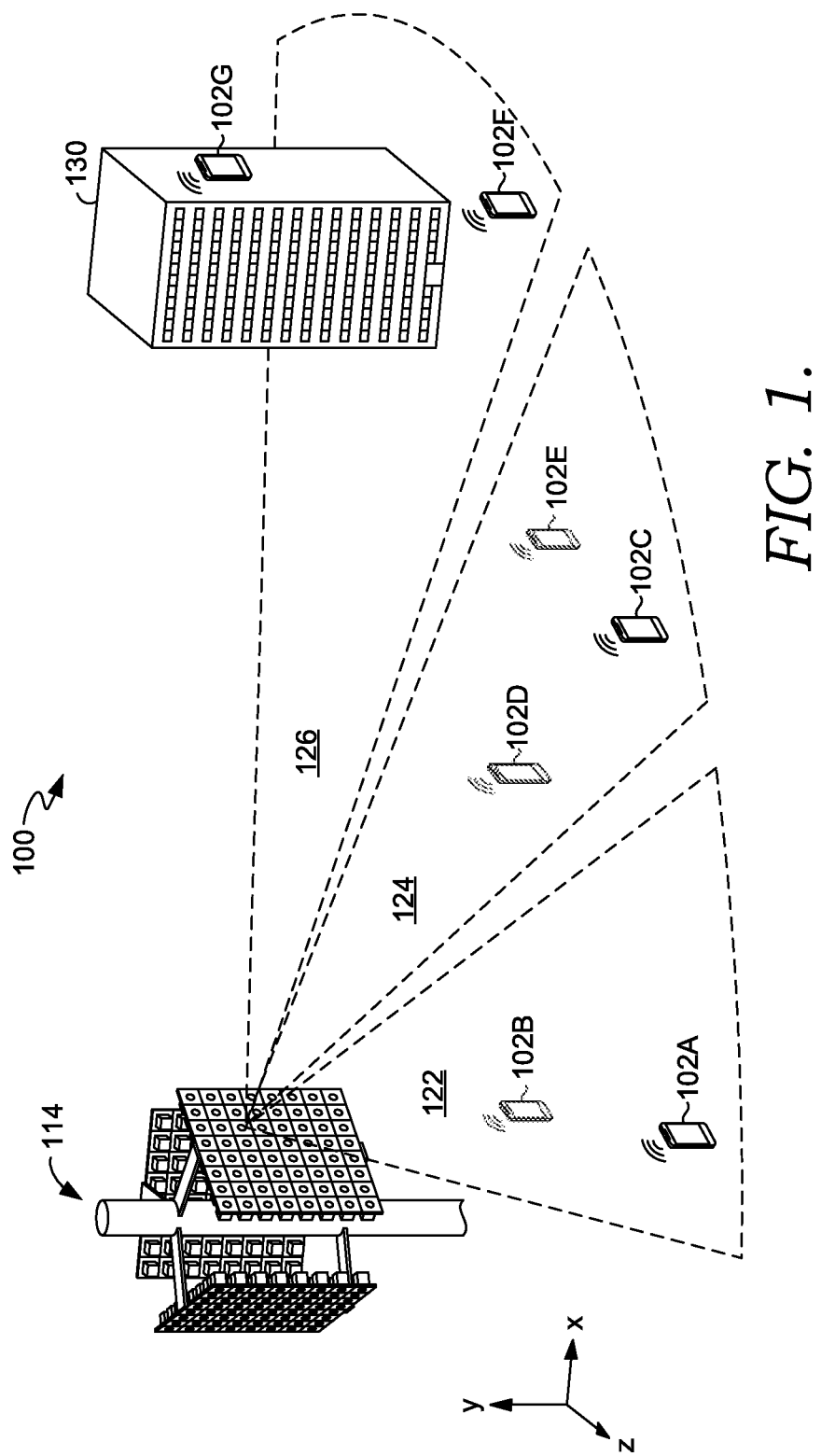
FIG. 1 depicts an example environment comprising a base station configuration employed to provide a priority-based multi-user (MU) multiple-input multiple-output (MIMO) pairing threshold for codebook beamforming, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CA Carrier Aggregation
CD-ROM Compact Disk Read Only Memory
CDMA Code Division Multiple Access
CSI Channel State Information
eNB Evolved Node B
FDD Frequency Division Duplex
gNB Next Generation Node B
GPRS General Packet Radio Service
GSM Global System for Mobile communications
DVD Digital Versatile Discs
EEPROM Electrically Erasable Programmable Read Only Memory
FD-MIMO Full-Dimension Multiple-Input Multiple-Output IoT Internet of Things
LTE Long Term Evolution
MAC Media Access Control
MIMO Multiple-Input Multiple-Output
MU-MIMO Multi-User Multiple-Input Multiple-Output
NR New Radio
OFDM Orthogonal Frequency-Division Multiplexing
OTDOA Observed Time Difference of Arrival
PC Personal Computer
PDA Personal Digital Assistant
PLMN Public Land Mobile Network
QoS Quality of Service
RAM Random Access Memory
RF Radio-Frequency
ROM Read Only Memory
RSRP Reference Transmission Receive Power
RSRQ Reference Transmission Receive Quality
RSSI Received Signal Strength Indicator
SIM Subscriber Identity Module
SINR Signal-to-Interference and Noise Ratio
TDD Time Division Duplex
TDMA Time Division Multiple Access
UICC Universal Integrated Circuit Card
VoNR Voice over NR
VoLTE Voice over LTE In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Additionally, a "mobile device," as used herein, is a device that has the capability of using a wireless communications network, and may also be referred to as a "computing device," "user device," "wireless communication device," or "UE." A mobile device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A UE may be, in an embodiment, similar to user devices 102A-102G, described herein with respect to FIG. 1; similar to user devices 202A-202F, described herein with respect to FIG. 2; or similar to user devices 302A-302F, described herein with respect to FIG. 3. A UE may also be, in another embodiment, similar to user device 800, described herein with respect to FIG. 8.

Further, the term "coverage area," as used herein, refers to a geographical area wherein a network provides wireless communication services (e.g., the transfer of information without the use of an electrical conductor as the transferring medium). Wireless communication services may include, but are not limited to, the transfer of information via radio waves (e.g., Bluetooth®), satellite communication, infrared communication, microwave communication, Wi-Fi, and mobile communication. Embodiments of the present technology may be used with different wireless telecommunication technologies or standards, including, but not limited to, CDMA 1×Advanced, GPRS, Ev-DO, TDMA, GSM, WiMax technology, LTE, or LTE Advanced, among other technologies and standards.

In some aspects, UEs can optionally utilize the network to communicate with other computing devices (e.g., a mobile device(s), a server(s), a personal computer(s), etc.) through a "cell site" or "base station" using any one of a plurality of wireless communication protocols, such as 3G, 4G/LTE, 5G and other related protocols. In aspects, the network may be a telecommunications network(s), or a portion thereof. A telecommunications network might include an array of devices or components (e.g., one or more base stations). Components such as terminals, links, and nodes (as well as other components) can provide connectivity in various implementations. The network can include multiple networks, as well as being a network of networks.

In some aspects, the network can be part of a telecommunications network that connects subscribers to their immediate service provider. In some instances, the network can be associated with a telecommunications provider that provides services (e.g., 5G and LTE) to various types of UEs. For example, the network may provide voice, SMS, or data services to user devices or corresponding users that are registered or subscribed to utilize the services provided by a telecommunications provider. The network can comprise any communication network providing voice, SMS, or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some aspects, the coverage area includes one or more cells or sectors in which a base station may serve UEs, for example. The coverage area may be associated with one or more beams for serving UEs within the coverage area. In aspects, UEs may communicate with a base station through an active beam associated with a coverage area in which the corresponding UE is located. The UEs may receive, from the base station, information indicating a periodicity at which control information is to be communicated on a control channel through a control-information beam. The UEs may communicate, with the base station, the control information on the control channel through the control-information beam at the periodicity.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, UEs within a MIMO environment are scheduled based on the same time and the same frequency resources. One problem with the conventional scheduling systems is that a UE experiences interference from other beams associated with the other UEs that are similarly scheduled based on the same time and the same frequency resources. For example, two UEs having beams that have high directional correlation cause interference with each other. Interference may include interference associated with SINR and modulation coding scheme degradation, for example. As such, a scheduling scheme that reduces this interference would be desirable.

The systems and methods provided herein can alleviate the problems discussed above. For instance, in aspects, the systems and methods disclosed herein improve upon the interferences associated with the SINR and modulation coding scheme degradation when two UEs having beams with high correlation are scheduled together for receiving the same resources. The systems and methods disclosed herein improve upon these deficiencies in the conventional systems by implementing groupings of UEs that are priority-based. For example, the systems and methods disclosed herein provide for MU-MIMO pairing thresholds for codebook beamforming, as described in further detail below.

Accordingly, in one aspect, a system is provided for a priority-based MU-MIMO pairing threshold for codebook beamforming. The system comprises an antenna array comprising one or more antenna elements and one or more processors configured to execute operations. For example, the operations comprise identifying a plurality of user device candidates for a user device pairing. Additionally, a user device of the plurality of user device candidates is determined to have a higher priority than another user device of the plurality of user device candidates. A second beam corresponding to a second user device is determined to be less correlated to a first beam corresponding to the first user device than a third beam corresponding to a third user device. The correlation of the first beam and the second beam is determined to be below a threshold. Based on determining that the correlation is below the threshold, the user device is paired with the second user device for sharing a resource.

In another aspect, a method is provided for a priority-based MU-MIMO pairing threshold for codebook beamforming. The method comprises identifying a user device having a predetermined priority. A second user device is also identified. A correlation between a first beam corresponding to the user device with a second beam corresponding to a second user device is determined to be below a threshold. Upon determining that the correlation is below the threshold, the user device is paired with the second user device for sharing a resource.

In yet another aspect, a system is provided for a priority-based multi-user (MU) multiple-input multiple-output (MIMO) pairing threshold for codebook beamforming. The system comprises an antenna array comprising one or more antenna elements and a baseband processing unit comprising a digital signal processor, a priority controller, and a scheduler. The baseband processing unit is configured to execute operations comprising identifying a plurality of user device candidates for a user device pairing. The baseband processing unit determines, via the priority controller, a priority of a user device of the plurality of user device candidates. The baseband processing unit determines whether a correlation of the of a first beam corresponding to the user device with a second beam corresponding to a second user device of the plurality of user device candidates is below a threshold. Based on determining that the correlation is below the threshold, the user device is paired with the second user device for sharing a resource.

Turning now to FIG. 1, example environment 100 comprises UEs 102A-102G; a cell cite 114 that provides a first coverage area 122, a second coverage area 124, and a third coverage area 126 to UEs 102A-102G; and building 130. Example environment 100 is but one example of a suitable environment for determining a priority-based pairing threshold for codebook beamforming, and is not intended to suggest any limitation as to the scope of use or functionality of the invention. Neither should the environment 100 be interpreted as having any dependency or requirement relating to any one or combination of components illustrated.

Beginning with UEs 102A-102G, the UEs may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 800 in FIG. 8) that communicates via wireless communications to interact with a public or private network.

In aspects, UEs 102A-102G may be configured to communicate using 4G (e.g., LTE) or 5G. In some aspects, the UEs 102A-102G comprise components to establish a 5G connection with a 5G gNB and to be served according to 5G over that connection. In some aspects, UEs 102A-102G may be an E-UTRAN New Radio-Dual Connectivity (ENDC) device. ENDC allows a user device to connect to an LTE eNB that acts as a master node and a 5G gNodeB that acts as a secondary node. As such, in these aspects, the ENDC device may access both LTE and 5G simultaneously, and in some cases, on the same spectrum band.

In aspects, UEs 102A-102G may have different capabilities. For example, the UEs 102A-102G may have different capabilities for carrier aggregation. In embodiments, some of the UEs 102A-102G are configured to use multiple channels to communicate data with a network. In some aspects, some of the UEs 102A-102G are configured to support a higher number and size of carrier aggregation parameter combinations than some of the other UEs 102A-102G. In some aspects, UEs 102A-102G may comprise different SIM configurations. For example, some UEs 102A-102G are multi-SIM computing devices. In some aspects, UEs 102A-102G are associated with different SIM network operator providers. For example, one SIM configuration may include a UICC that is configured with SIM or universal SIM applications for enabling access to a variety of different networks. Alternatively, in a CDMA network, a SIM may be a UICC removable user identity module or a CDMA SIM on a card.

One or more of the various SIM configurations of UEs 102A-102G may further store home identifiers (e.g., a System Identification Number/Network Identification Number pair, a Home PLMN code, etc.) to indicate the SIM network operator provider associated with the corresponding UE. For example, some of the UEs 102A-102G are associated with a home PLMN and some of the UEs 102A-102G are associated with a visited PLMN. In some aspects, some of UEs 102A-102G are associated with a mobile virtual network operator PLMN. In some aspects, a PLMN manager of one of the UEs 102A-102G may determine that a signal-related condition between the one UE and the cell site 114 of the PLMN has improved compared to a signal-related condition at a prior time. In response to the improvement, the PLMN manager may reattempt registration with the PLMN, allowing the UE to establish a network service.

In aspects, UEs 102A-102G are configured to receive QoS metrics corresponding to one or more wireless links between devices in example environment 100 (e.g., between UE 102A and base station 114). The QoS metrics may comprise one or more of: latency, RSSI, packet error rate, jitter, bit error rate, signal to noise ratio, SINR, carrier to interference plus noise ratio, and modulation and coding schemes histogram data. Further, some of UEs 102A-102G may be utilizing VoNR. In some aspects, some of UEs 102A-102G utilize VoNR and some of UEs 102A-102G utilize VoLTE. Continuing the example, some of UEs 102A-102G may be utilizing best-effort traffic services.

In some aspects, UEs 102A-102G are enrolled in a tiered service plan. For example, a high service tier may guarantee a particular bit rate is used. In some embodiments, a higher-tiered service has a maximum dropped call rate that is lower than the maximum rate for a lower-tiered service. In some embodiments, the higher-tiered service has a maximum jitter and latency that is lower than the maximum for the lower-tiered service. In some embodiments, the higher-tiered service provides a higher voice quality service than the lower-tiered service. In some embodiments, the higher-tiered service provides a more robust vocoder than the lower-tiered service. In aspects, the level of the tiered service that a UE is subscribed to may be determined using a lookup table.

As shown in FIG. 1, UEs 102A-102G may wirelessly communicate with base station 114 using one or more of 4G and 5G, sometimes simultaneously. Additionally, other wireless communication protocols may be utilized in conjunction with aspects described herein, as LTE and 5G are used for exemplary purposes only and not for limitation. In some aspects, the eNB or the gNB corresponding to base station 114 may comprise a macro base station, a small cell or femto base station, a relay, and so forth. In aspects, cell site 114 may be configured as FD-MIMO, massive MIMO, 3G, 4G, 5G, another generation communication system, or 802.11.

In some aspects, cell site 114 may include one or more band pass filters, radios, antenna arrays, power amplifiers, transmitters/receivers, digital signal processors, control electronics, GPS equipment, and the like. As discussed herein, cell site 114 is deployed in a network to control and facilitate, via one or more antenna arrays, the broadcast, transmission, synchronization, and receipt of one or more wireless signals in order to communicate with, verify, authenticate, and provide wireless communications service coverage to one or more UEs or other types of devices that request to join or are connected to the network.

In aspects, cell site 114 utilizes a massive MIMO antenna array comprising 128 antennas, for example. In some aspects, 64 of those antennas are configured as downlink antennas and the other 64 are configured as uplink antennas. For example, all of the antennas having positive polarization are configured as the downlink antennas for transmitting signals, whereas those having negative polarization are configured as the uplink antennas for receiving signals.

Continuing the example, the cell site 114 may provide 16 layers of MIMO transmission (e.g., four transmit antennas for beamformed transmission associated with one layer). In some embodiments, massive MIMO service is provided by cell site 114 via a different sized massive MIMO antenna array or with other types of antenna structures.

The layers of the MIMO transmission (i.e., multiple different RF propagation paths) provided via the massive MIMO service may provide for engaging in coverage area communication. MIMO transmission techniques may include transmission of multiple spatial layers to the same UE or multiple spatial layers to multiple UEs. In aspects, the MIMO service provides for concurrent communications on multiple different RF propagation paths. In aspects, the multiple layers occupy the same frequency resources (e.g., subcarriers and physical resource blocks). In some aspects, cell site 114 may weight and pre-code transmissions from particular antennas of the massive MIMO antenna array.

Cell site 114 may also employ beamforming (i.e., spatial filtering, directional transmission, or directional reception). During beamforming, some signals propagating at particular orientations with respect to the antenna array may experience constructive interference while others experience destructive interference. The cell site 114 may adjust the signals communicated via the antenna elements by applying amplitude offsets, phase offsets, or both. The adjustments associated with each of the antenna elements may be defined by a beamforming weight set associated with a particular orientation (e.g., with respect to the antenna array of the transmitting device or receiving device, or with respect to some other orientation). In aspects, cell site 114 employs sweeping techniques. For example, cell site 114 may transmit signals (e.g., reference signals, beam selection signals, synchronization signals, or other control signals) multiple times in a plurality of directions.

In some embodiments, the antenna array may be an active phased antenna array or a dynamic phased array. In other aspects, the antenna array may comprise monopole, loop, parabolic, traveling-wave, aperture, yagi-uda, conical spiral, helical, conical, radomes, horn, or apertures, or any combination thereof. In some aspects wherein the base station 114 uses both 4G and 5G communication services, communication services eNB provides on one or more carriers that are different services than those the gNB provides on the one or more carriers. In some aspects, 4G services of the base station 114 support five component carriers and the 5G services of the base station 114 support sixteen contiguous and non-contiguous component carriers. The antenna array may support MIMO, MU-MIMO, cooperative MIMO, or massive MIMO techniques and protocols, in various embodiments.

In aspects, cell site 114 can communicate with multiple other cell sites using MU-MIMO communications techniques. When the IEEE 802.11ax standard is supported in such communications, an access point can have eight cell sites join in an MU-MIMO group for transmission using an MU-MIMO physical layer convergence protocol packet data unit. In aspects, to optimize MU-MIMO communications with multiple cell sites, the cell site 114 can include or communicate with a baseband processing unit (described herein in FIG. 6) that is configured to communicate with the multiple cell sites and perform aspects of the various techniques for determining a priority-based MU-MIMO pairing threshold for codebook beamforming based on communications with the multiple cell sites.

In aspects, the antenna array may produce a plurality of beams that provide services to coverage areas 122, 124, and 126. In aspects, one or more beams provide wireless communication services to coverage area 122. Further, one or more of the plurality of beams may be associated with different directions at the antenna array. In aspects, each of the plurality of beams is transmitted in a different direction from the antenna array. The direction associated with each of the plurality of beams may be predefined or preset, and each of the plurality of beams may be associated with a different direction. In some aspects, the plurality of beams form a grid-like coverage area.

In one example embodiment, a plurality of user device candidates for a user device pairing are identified. In aspects, UE 102B and UE 102F may be identified as user device candidates for a user device pairing. Continuing the example, UE 102B may have a higher priority than UE 102F. In aspects, the higher priority may be based on subscriptions of UE 102B and UE 102F to a tiered plan. In some aspects, the higher priority may be based on UE 102B utilizing VoNR and UE 102F utilizing VoLTE. In some aspects, the higher priority may be based on UE 102B having better QoS metrics corresponding to one or more wireless links with base station 114. As such, based on UE 102B having a higher priority, a threshold is determined for a correlation of a beam corresponding to UE 102B with other beams associated with other UEs for the pairing.

Continuing the example, correlation of a first beam corresponding to UE 102B with a second beam corresponding to UE 102F is associated with a direction of the first beam providing communication services to UE 102B and a direction of the second beam providing communication services to UE 102F, wherein the first beam and the second beam are of the plurality of beams being transmitted in different directions from the antenna array. In some aspects, in addition to beam direction, the correlation is also determined based on a position of the UE and RF measurements determined by the UE and subsequently transmitted to the base station 114. A correlation is low when a first beamforming vector of the first beam and a second beamforming vector of the second beam have sufficient separation. For example, a high correlation value that is closer to 1 has a high likelihood of interference with the other corresponding beam. Additionally, a low correlation value that is closer to 0 has a low likelihood of interference with the other corresponding beam.

In some aspects, the threshold for UE 102B correlation with other UEs (such as with UE 102F, for example) for the UE pairing is dependent upon the priority of the UE. For example, a UE having a high priority would have a lower correlation threshold value than a UE having a low priority. Example Table 1, depicted below, provides example correlation thresholds associated with UE priority:

TABLE 1

| UE Priority | User-Dependent dlMuMimoCorrThd |
|---|---|
| Highest | 0.1 |
| Medium | 0.3 |
| Low | 0.5 |

For example, if UE 102B has the highest priority, the correlation of the first beam corresponding to UE 102B with the second beam corresponding to UE 102F is to be below a threshold of 0.1 for UE 102B and UE 102F to be paired together for sharing a resource in an MU-MIMO environment. In aspects, the second beam is less correlated to the first beam than a third beam corresponding to a third user device, such as UE 102A for example. As another example, if UE 102E has the medium priority, the correlation of UE 102E with UE 102F is to be below a threshold of 0.3 for UE 102E and UE 102F to be paired together for sharing the resource in the MU-MIMO environment. In yet another example, if UE 102E has a medium-high priority, the correlation of UE 102E with UE 102F is to be below a threshold of 0.2 for UE 102E and UE 102F to be paired together for sharing the resource in an MU-MIMO environment.

In some aspects, UE 102B has the highest priority and is already paired with UE 102F. One of the plurality of user device candidates 102A-102G may be identified as having a lower priority than UE 102B. For example, 102G is identified as having the lower priority. Further, a correlation threshold for UE 102G is determined based on UE 102G having the lower priority. For example, using example Table 1 above, the correlation threshold for the UE 102G is determined to be 0.5, which is a lower value than the threshold for UE 102B having the highest priority. In an aspect, a beam associated with UE 102G has a correlation with a beam associated with UE 102B below the correlation threshold of 0.5. Continuing the example, the beam associated with UE 102G also has a correlation with the beam associated with UE 102F that is below the correlation threshold, and UE 102G is paired with UEs 102B and 102F for sharing the resource in the MU-MIMO environment. For example, the low correlation with UE 102F may be based on UE 102G utilizing services of a beam different than UE 102F based on altitude differences between UE 102F and UE 102G (e.g., due to a location of UE 102G towards the top of building 130).

In some aspects, one beam associated with a UE in a pairing may be associated with a horizontal plane and another beam associated with another UE in the pairing may be associated with a vertical plane. In some embodiments, one grouping of UEs (of the plurality of candidate UEs 102A-102G) comprises an equal number of UEs in the horizontal and vertical planes. In another embodiment, another grouping of the UEs may comprise an unequal number of UEs in each of the two planes. For example, one MU-MIMO grouping of UEs may comprise six UEs in the horizontal plane and six UEs in the vertical plane. In another instance, the MU-MIMO grouping may comprise three UEs in the vertical plane and two UEs in the horizontal plane.

Figure 2:
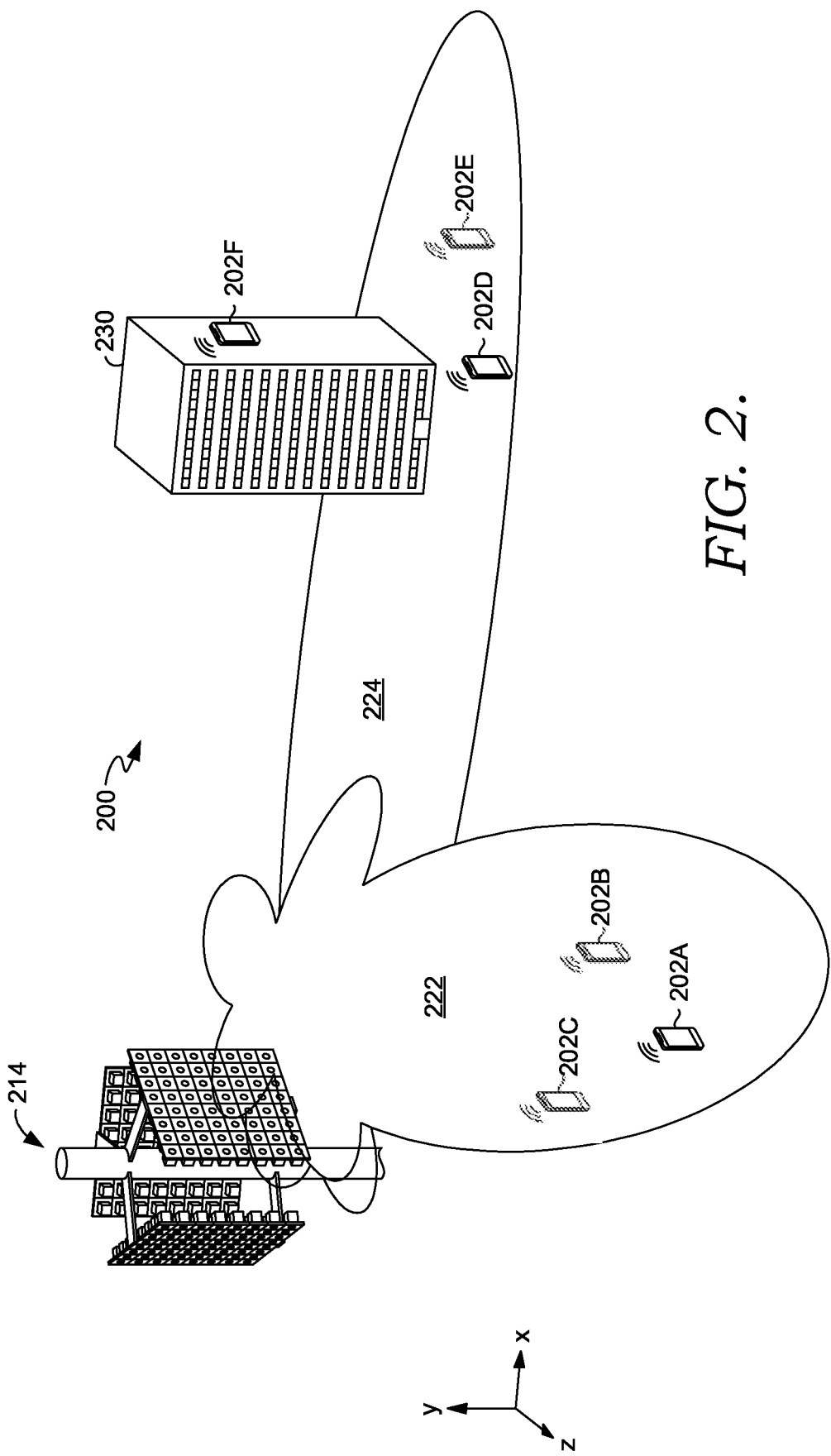
FIG. 2 depicts another example environment comprising a base station configuration employed to provide a priority-based MU-MIMO pairing threshold for codebook beamforming, in accordance with aspects herein.

Turning to FIG. 2, example environment 200 depicts two beams (e.g., beam 222 and beam 224) having low correlation. For example, example environment 200 comprises UEs 202A-202F, base station 214, beam 222 and beam 224, and building 230. In one aspect, base station 214 is configured to identify UEs 202A-202F as candidates for a user device pairing of two or more UEs for sharing a resource in a MIMO environment (e.g., an MU-MIMO environment). Additionally, base station 214 may determine a priority for each of the UEs 202A-202F. In some aspects, a priority is determined by using a lookup table associated with a service type subscribed to by one or more of the UEs 202A-202F.

In one embodiment, base station 214 determines that UE 202C has a high priority. In response to determining the high priority of UE 202C, base station 214 determines that a correlation between a beam associated with UE 202C and a beam associated with UE 202D is below a threshold. The threshold may be determined based on UE 202C having a high priority. For example, the threshold may be a value of 0.08 and the correlation between UE 202C and UE 202D may be below the 0.08 threshold. In response to determining that the correlation between UE 202C and UE 202D is below the threshold, base station 214 may pair UE 202C and UE 202D into a user device pairing for sharing a resource. For example, the user device pairing may be associated with codebook beamforming in an MU-MIMO environment.

In aspects, base station 214 may identify UE 202E as having a lower priority than UE 202C and UE 202D. Based on the priority of UE 202E, base station 214 may determine a correlation threshold for pairing UE 202E with UEs in an MU-MIMO environment for codebook beamforming. The determined correlation threshold for UE 202E is a higher value than the threshold determined for UE 202C, based on the priorities of UE 202E and UE 202C. Further, base station 214 determines that a first correlation between a beam associated with UE 202E and a beam associated with UE 202C is below the correlation threshold, and that a second correlation between UE 202E and UE 202D is below the correlation threshold. In response, the base station 214 pairs UE 202E with UEs 202C-202D. As such, base station 214 provides the resource to UEs 202C-202E.

In aspects, base station 214 may determine that UE 202F has a medium priority. Based on the priority of UE 202F, base station 214 may determine a correlation threshold for pairing UE 202F with UEs in an MU-MIMO environment for codebook beamforming. In aspects, based on the priority of UE 202F being medium and the determined priorities for UEs 202C-202D in the pairing, the correlation threshold for UE 202F is a higher value than the threshold determined for UE 202C and a lower value than the threshold determined for UE 202D. Further, base station 214 determines that a correlation between a beam associated with a UE 202F and a beam associated with UE 202D is not below the correlation threshold for UE 202F. In response, the base station 214 does not pair UE 202F with the pairing of UEs 202C-202D. In aspects, the beam 224 is reflected or diffracted to reach the UE 202F in building 230.

Figure 3:
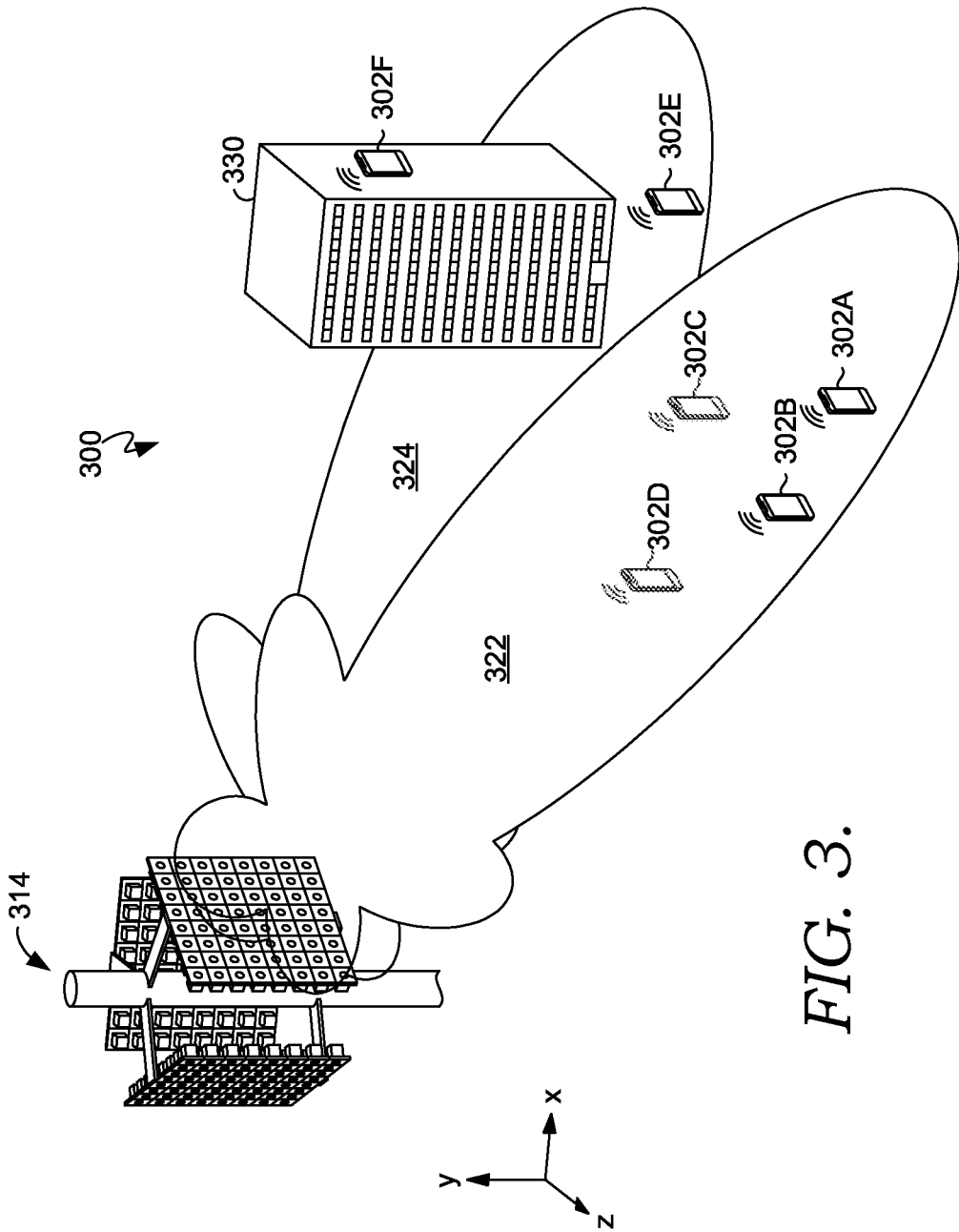
FIG. 3 depicts yet another example environment comprising a base station configuration employed to provide a priority-based MU-MIMO pairing threshold for codebook beamforming, in accordance with aspects herein.

Turning to FIG. 3, example environment 300 depicts two beams (e.g., beam 322 and beam 324) having high correlation. For example, example environment 300 comprises UEs 302A-302F, base station 314, beam 322 and beam 324, and building 330. In one aspect, base station 314 is configured to identify UEs 302A-302F as candidates for a user device pairing of two or more UEs for sharing a resource in a MIMO environment (e.g., an MU-MIMO environment). Additionally, base station 314 may, for example, determine that UE 302A has the highest priority of the UEs 302A-302F. In some aspects, UE 302A may be one of a subset of the UEs 302A-302F having the highest priority.

In response to determining the priority of UE 302A, base station 314 may whether a correlation of a beam associated with the UE 302A with a beam associated with a second user device of UEs 302A-302F is below a threshold. For example, base station 314 may determine that a correlation between UE 302A and 302E is not below the threshold; and that a correlation between UE 302A and 302F is not below the threshold. Continuing the example, base station 314 may additionally determine a priority for UE 302C and a correlation threshold for UE 302C based on the priority determined for UE 302C. Thereafter, the base station 314 may determine that a correlation between UE 302C and 302E is not below the correlation threshold. Based on determining that each correlation is not below the threshold, user device pairings for these UEs are delayed at this time.

Turning to FIGS. 4A-4B, example codebooks associated with beamforming in a 5G NR environment are provided. For example, FIG. 4A provides an example codebook supporting eight CSI reference signal antenna ports and FIG. 4B provides an example codebook supporting thirty-two CSI reference signal antenna ports. In aspects, FIG. 4A provides a total number of eight beam directions that are horizontal (N1*O1), and a total number of eight beam directions that are vertical (N2*O2). In aspects, FIG. 4B provides a total number of thirty-two beam directions that are horizontal (N1*O1), and a total number of eight beam directions that are vertical (N2*O2). Each block in FIGS. 4A and 4B is associated with a beam, and adjacent blocks have higher correlation values due to similarity features between beamforming vectors Ui and Uj. Blocks that are further away from each other have lower correlation values due to similarity features between beamforming vectors Ui and Uj. For example, beams associated with blocks that are not adjacent will experience less inter-beam interference, such as SINR and modulation coding scheme degradation interferences.

In aspects of FIG. 4A, a UE associated with column 3, row 4 is identified as having a predetermined priority. Further, a correlation between the UE associated with column 3, row 4 and a second UE associated with column 7, row 4 is determined. Continuing the example, the correlation is compared to a threshold. Upon determining that the correlation is below the threshold, the UE associated with column 3, row 4 is paired with the second UE associated with column 7, row 4 for sharing a resource. In some aspects, a second correlation between the UE associated with column 3, row 4 and a third UE associated with column 5, row 2 is determined. Upon determining that the second correlation is not below the threshold, the UE associated with column 5, row 2 is not added to the pairing.

In aspects of FIG. 4B, a UE associated with column 12, row 7 is identified as having a predetermined priority. Further, a correlation between the UE associated with column 12, row 7 and a second UE associated with column 18, row 4 is determined. Continuing the example, the correlation is compared to a threshold. Upon determining that the correlation is below the threshold, the UE associated with column 12, row 7 is paired with the second UE associated with column 18, row 4 for sharing a resource. The illustration of FIGS. 4A and 4B show that FIG. 4B provides a higher number of beams that have a low correlation compared to the number of beams that have a low correlation in FIG. 4A.

Figure 5:
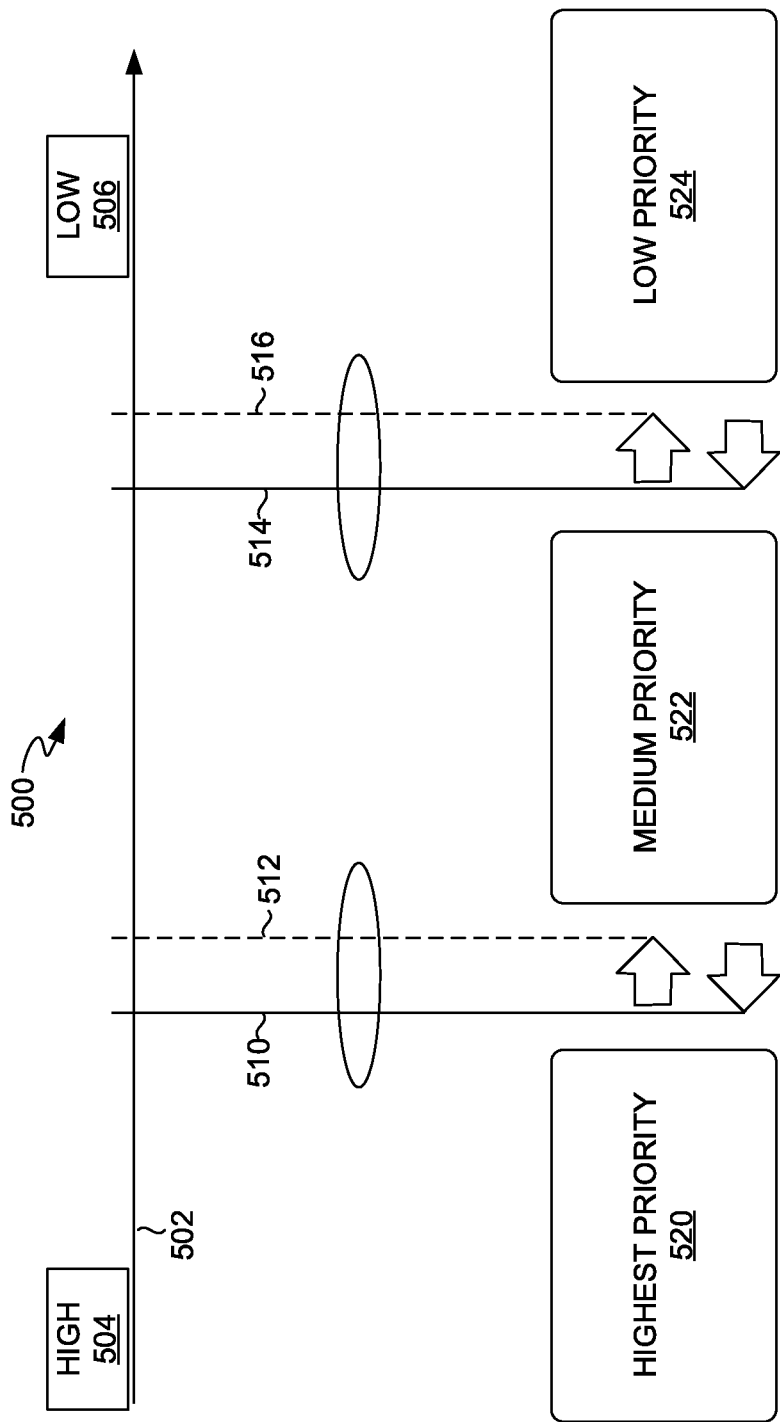
FIG. 5 illustrates an example diagram for dynamically changing a priority for a user device, in accordance with aspects herein.

Turning to FIG. 5, example diagram 500 illustrates an embodiment for dynamically changing a priority for a user device. Example diagram 500 comprises high RF condition changes 504 and low RF condition changes 506. In response to receiving signal data from the user device after pairing the user device with the second user device for sharing the resource, as described in previous figures above, the user device will be assigned a new priority. In aspects, the RF condition is associated with an RSRP value, an SINR value, or a modulation value received from the user device. If the current change to the RF condition is a high RF condition 504, then the user device will be assigned the highest priority 520 if the RF condition value is above a first threshold 510; otherwise, if the RF condition is below the first threshold 512, then the user device will be assigned a medium priority 522. If the current change to the RF condition is a low RF condition 506, then the user device will be assigned the medium priority 522 if the RF condition value is above a second threshold 514; otherwise, if the RF condition is below the second threshold 516, then the user device will be assigned a low priority 524.

In aspects, after pairing the user device with the second user device for sharing the resource, as described in previous figures above, the system may determine a change to a radio frequency condition associated with the user device based on the signal data received by the user device after the initial pairing. In response to comparing the radio frequency condition determined from the signal data to at least one of the thresholds 510, 512, 514, and 516, the system dynamically changes the priority of the user device. In response to changing the priority, the system may dynamically change the correlation threshold based on the changed priority. In some aspects, the correlation threshold is reduced when the priority is increased. In some aspects, the correlation threshold is increased when the priority is decreased.

Continuing the example, the system may determine a new correlation between a beam associated with the user device and a second beam associated with the second user device. Upon determining that the new correlation is below the dynamically changed correlation threshold, the system may provide the resource (or another resource) to the user devices of the pairing. The resource may comprise an uplink and a downlink resource.

Figure 6:
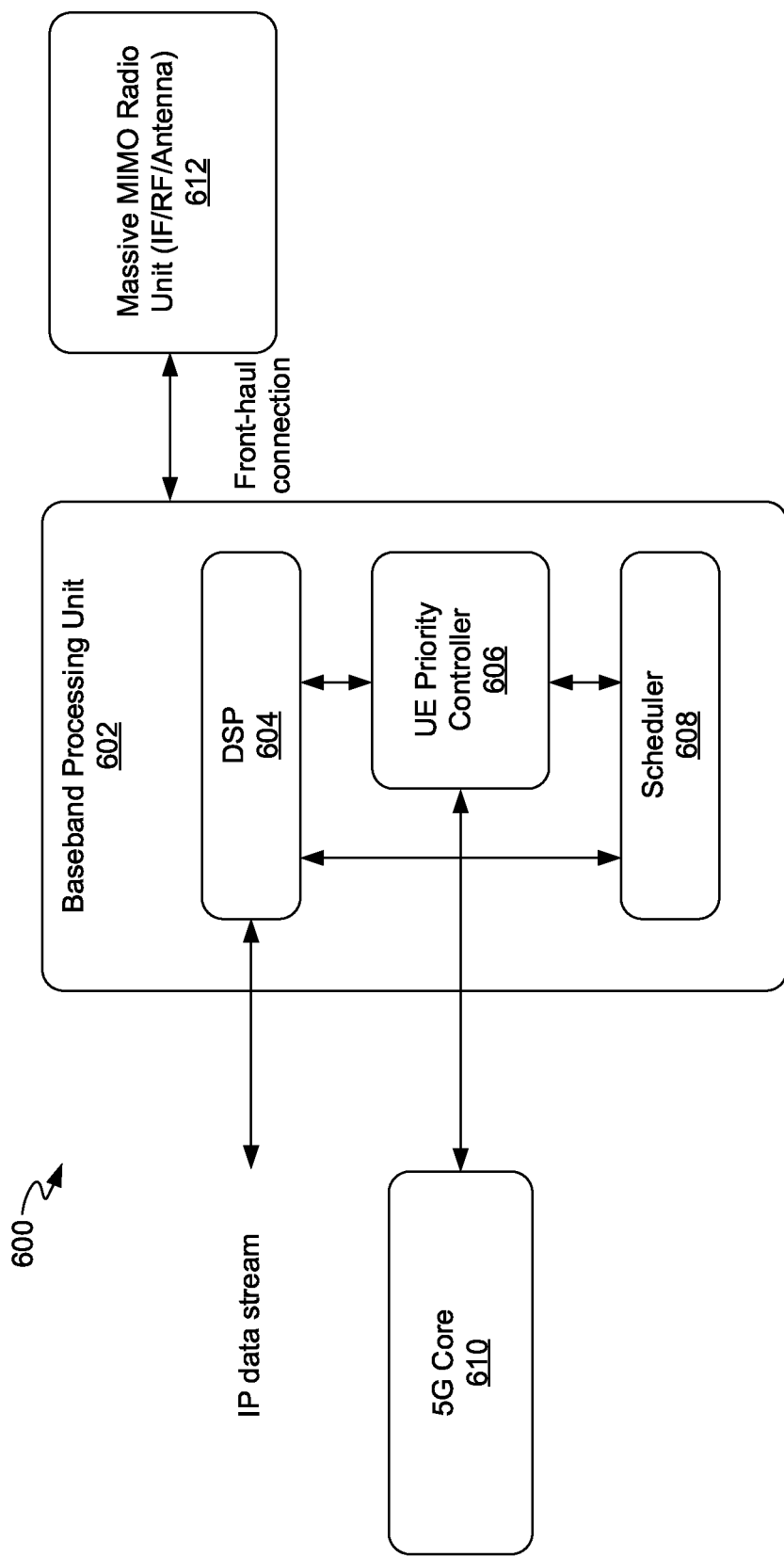
FIG. 6 depicts a system comprising a band processing unit, in accordance with aspects herein.

Turning to FIG. 6, example system 600 depicts a band processing unit 602 communicatively coupled with a 5G core 610 and a massive MIMO radio unit 612 via a fronthaul connection. As depicted in example system 600, band processing unit 602 may comprise a digital signal processor (DSP) 604, a UE priority controller 606, and a scheduler 608. In some aspects, band processing unit 602 communicates with the 5G core 610 wirelessly. In some aspects, band processing unit 602 communicates with massive MIMO radio unit 612 wirelessly. In some aspects, band processing unit 602 is physically coupled to massive MIMO radio unit 612.

For example, base station 114 of FIG. 1 may include at least one band processing unit 602 responsible for, among other things, digital baseband signal processing. For instance, CDMA and LTE Internet Protocol (IP) data stream are received via a wireless communications network and are digitally combined by the band processing unit 602 at the base station 114. The received baseband signal is then transmitted to the massive MIMO radio unit 612. Digital baseband signals received from the massive MIMO radio unit 612 are demodulated by the band processing unit 602, and the resulting IP data stream is then transmitted by the band processing unit 602 to the network. In aspects, a base station (e.g., base station 114) may also include or be associated with a master list (e.g., a table) of beamforming weights applicable to a plurality of antennas.

In aspects, the data received by the band processing unit 602 may include at least one CSI, SINR, location data indicating a location associated with a coverage area, channel load, sector load, band load, front-to-back ratio, and upper side lobe suppression. In aspects, CSI data may indicate an objective measure of call quality for one of the user devices within the coverage area. In aspects, the location data may indicate specific coordinates of a UE (e.g., GPS coordinates), a distance between the UE and base station, or a direction a beam transmitted by the base station. The channel load data, received by band processing unit 602, may indicate a rate at which a UE is added or removed from communicating services provided by the base station within the coverage area associated with the location of the UE. Further, the channel load data may indicate a number of channels within a given band used by a user device. The sector load data may indicate the rate at which user devices are added or removed from communicating with a sector within the coverage area. Additionally, sector load data may comprise a bandwidth used by the UE within the corresponding sector. The front-to-back ratio may indicate the ratio of signal broadcast in a target direction compared to a signal broadcast in the opposite direction.

In aspects, the band processing unit 602 uses the data received (comprising one or more of the CSI, SINR, location data indicating a location associated with a coverage area, channel load, sector load, band load, front-to-back ratio, and upper side lobe suppression) to determine a priority of a UE, a correlation threshold of the UE, or a correlation value of a beam associated with the UE compared to another beam associated with another UE for determining whether the UE is to be paired with the other UE for sharing resources in an MU-MIMO environment. For example, band processing unit 602 identifies a plurality of user device candidates for a user device pairing. Further, the band processing unit 602 determines, via the priority controller 606, a priority of a user device of the plurality of user device candidates. In aspects, the priority is a predetermined priority based on a network service plan of the user device or quality of service of the user device.

Band processing unit 602 also determines whether a correlation of the user device with a second user device of the plurality of user device candidates is below a threshold. Based on determining that the correlation is below the threshold, band processing unit 602 pairs the user device with the second user device for sharing a resource. Based on the pairing, the scheduler 608 may schedule an uplink or a downlink resource for the pairing. The scheduler 608 may also schedule a resource block for the pairing. In some aspects, the scheduler 608 schedules a frequency band for the pairing. In some aspects, the scheduler 608 schedules a beam sweep in particular directions in a particular pattern.

In some aspects, the DSP 604 receives additional signal data (e.g., one or more of the CSI, SINR, location data indicating a location associated with a coverage area, channel load, sector load, band load, front-to-back ratio, and upper side lobe suppression) from the user device and the second user device after the pairing of the user device and the second user device. In response to receiving the additional signal data, the band processing unit 602 may determine that a change to a radio frequency condition has occurred. Based on the change to the radio frequency condition, the priority controller 606, which is interfacing with the DSP 604, dynamically changes the priority of the user device based on the change to the radio frequency condition. In response to dynamically changing the priority of the user device to a lower priority, the band processing unit 602 dynamically increases the threshold for the correlation of the user device with the second user device. In response to determining that the correlation is below the increased threshold, the band processing unit 602 provides a second resource or continues providing the resource for the pairing.

Figure 7:
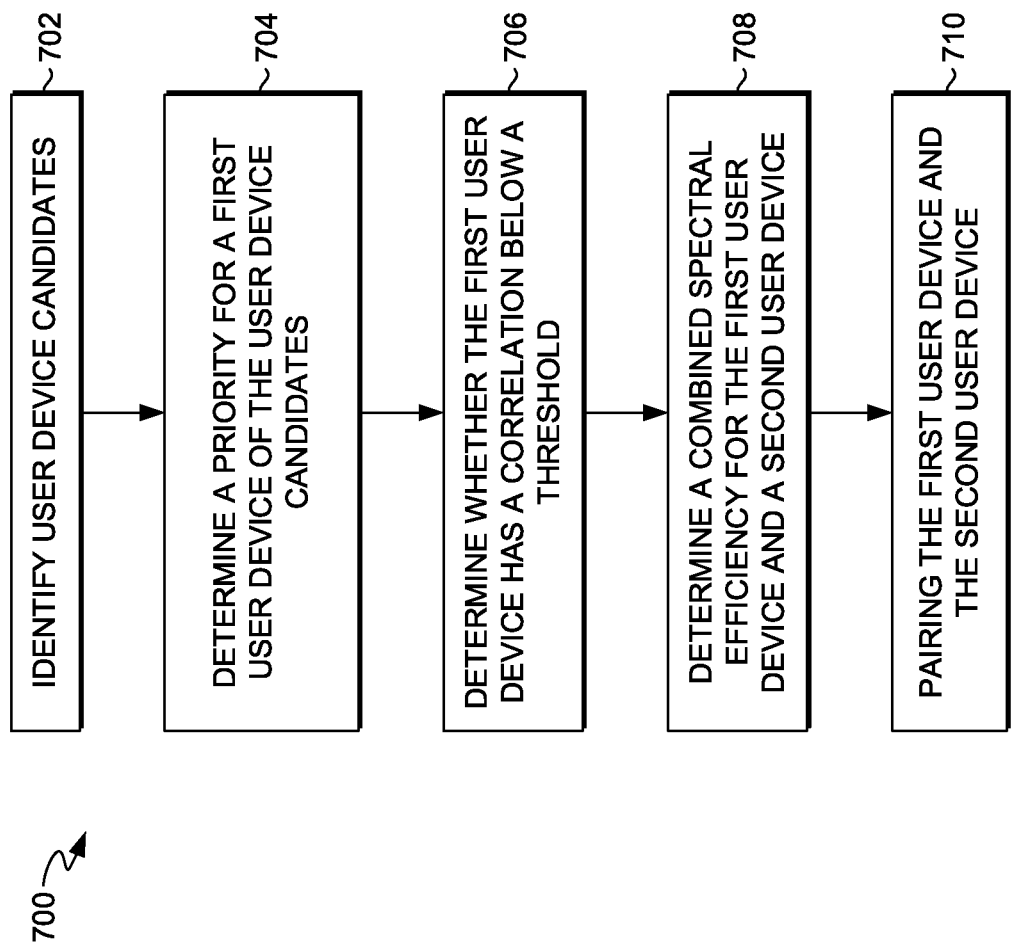
FIG. 7 depicts a flow diagram of an example method for a priority-based MU-MIMO pairing threshold for codebook beamforming, in accordance with aspects herein.

Turning now to FIG. 7, flow diagram 700 depicts an example method for determining a priority-based MU-MIMO pairing threshold for codebook beamforming. At step 702, user device candidates for priority-based pairing in a MIMO environment are identified. In some aspects, the user device candidates are associated with user devices receiving services from an associated base station or user devices requesting services from the base station. In some aspects, the user device candidates are receiving or requesting the services from one or more coverage areas. In some aspects, the user device candidates are receiving or requesting the services from the one or more coverage areas that are employing beamforming.

At step 704, a priority for a first user device of the user device candidates is determined. In some aspects, the first user device of the plurality of user device candidates has a higher priority than another user device of the plurality of user device candidates. In some aspects, the first user device has the highest priority of the plurality of user device candidates. In some aspects, a priority is determined for each user device of a subset of the plurality of user device candidates. Continuing the example, the priority for each user device of the subset may be determined based on a SINR measurement received from each user device. In some aspects, the priority of the user device is dependent upon a radio frequency condition of the user device (e.g., a distance between the user device and the base station).

In some aspects, the priority of the user device is a predetermined priority. For example, a lookup table may be used for classifying or identifying the priority of the corresponding user device. In some aspects, priority is associated with a high, medium, or low priority. In some aspects, each of the plurality of user device candidates are ranked based on their priority. In some aspects, the predetermined priority is based on the user device utilizing a home mobile virtual network operator rather than a different network operator. In some aspects, the predetermined priority is based on the user device having a particular home mobile virtual network operator (e.g., some home mobile virtual network operators have a higher priority than others).

In some aspects, the predetermined priority is based on enrollment of the user device on a high-tiered service plan (e.g., a high-tiered service plan may be associated with a particular bit rate, a particular maximum dropped-call rate, a particular maximum jitter and latency, or a particular voice quality service). In some embodiments, enrollment in a higher-tiered service plan provides a more robust vocoder than enrollment in a lower-tiered service plan. In some aspects, some of the user devices of the plurality of user device candidates are enrolled in a lower-tiered service plan and some of the user devices of the plurality of user device candidates are enrolled in a higher-tiered service plan.

In some aspects, a high priority user device is associated with being a VoNR device and low priority user devices are associated with being a VoLTE device. In some aspects, a high priority user device is associated with being a VoNR device and low priority user devices are associated with being a best-effort traffic device. In some aspects, the priority of the user device is dependent on QoS metrics, which may comprise one or more of: latency, RSSI, packet error rate, jitter, bit error rate, signal to noise ratio, SINR, carrier to interference plus noise ratio, and modulation and coding schemes histogram data. For example, a UE with a lower bit error rate to signal to noise ratio than another UE of the plurality of user device candidates would have a higher priority than the other UE having the higher lower bit error rate to signal to noise ratio.

At step 706, a correlation of the first user device (with the determined priority) with a second user device of the plurality of user device candidates is determined and compared to a threshold. For example, the correlation of the first user device with the second user device may be determined based on a comparison between a first beam associated with the user device and a second beam associated with the second user device. In some aspects, the second beam is determined to be less correlated to the first beam than a third beam corresponding to a third user device. In some aspects, the first beam is determined to be less correlated to the second beam than the third beam. In aspects, the correlation value of the comparison of the two beams indicates an amount of correlation between a target signal (e.g., of the first beam) and an interference signal (e.g., from the second beam). In aspects, a high correlation value may correspond to the target signal being similar to the interference signal (e.g., including a high level of noise), whereas a low correlation value may correspond to the target signal being different from the interference signal (e.g., including a lower level of noise).

In some aspects, the threshold depends upon the priority determined for the first user device. For example, the threshold value will be a lower number if the priority of the user device is higher; and the threshold value will be a higher number if the priority of the user device is lower. Stated differently, a first threshold, for the first user device having a high priority, is a lower value than a second threshold, for the second user device having a low priority. In aspects, the threshold changes based on the priority of the user device changing.

At step 708, a combined spectral efficiency is determined for the first user device and the second user device. For example, in response to determining that the correlation of the user device with a second user device is below the threshold, a combined spectral efficiency may be determined. In aspects, a spectral efficiency is determined for the first user device and the second device, then each individual spectral efficiency is compared to the combined spectral efficiency. The combined spectral efficiency may be determined to be better than each individual spectral efficiency.

At step 710, the first user device and the second user device are paired for resource sharing based on determining that the correlation is below the threshold. In some aspects, the pairing is also based on the combined spectral efficiency being better than each individual spectral efficiency. In some aspects, the resource comprises an uplink or downlink resource, a resource block, or a frequency bandwidth. In some aspects, a different resource is shared based on the first user device having a changed priority based on a radio frequency condition. In some aspects, a third user device is paired with the first user device and the second user device for resource sharing based on the third user device having a correlation between both the first and second user devices that is below a correlation threshold. The correlation threshold may be based on a determined priority for the third user device.

Turning now to FIG. 8, a diagram is depicted of an exemplary computing environment suitable for use in implementations of the present disclosure. In particular, the exemplary computer environment is shown and designated generally as UE/user device 800. User device 800 is but one example of a suitable computing environment and is not intended to suggest any limitation as to the scope of use or functionality of the invention. Neither should user device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, user device 800 includes bus 802 that directly or indirectly couples the following devices: memory 804, one or more processors 806, one or more presentation components 808, input/output (I/O) port(s) 810, I/O component(s) 812, power supply 814, and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O component(s) 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "user device."

User device 800 typically includes a variety of computer-readable media. Computer-readable media can be any available media that can be accessed by user device 800. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 804, memory 804 includes computer-storage media in the form of volatile or nonvolatile memory. Memory 804 may be removable, nonremovable, or a combination thereof. Examples of memory 804 include solid-state memory, hard drives, optical-disc drives, etc. For instance, memory 804 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 806, the one or more processors 806 read data from various entities such as bus 802, memory 804 or I/O component(s) 812. The one or more processors 806 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 806 execute instructions, for example, of an Operating System of the user device 800 or of one or more suitable applications.

Further, the one or more presentation components 808 present data indications to a person or other device. Examples of one or more presentation components 808 include a display device, speaker, printing component, vibrating component, etc. Additionally, I/O port(s) 810 allow user device 800 to be logically coupled to other devices including I/O component(s) 812, some of which may be built in user device 800. Illustrative I/O component(s) 812 include a microphone, joystick, game pad, satellite dish, scanner, printer, wireless device, etc. Furthermore, power supply 814 may include any suitable source of power, such as a rechargeable lithium polymer battery or an alternating current power converter.

Turning to radio 816, the radio 816 facilitates communication with a wireless telecommunications network. For example, radio 816 may facilitate communication via wireless communication signals, RF signals, frames, blocks, transmission streams, packets, messages, data items, or data. The terms "radio," "controller," "antenna," and "antenna array" are used interchangeably to refer to one or more software and hardware components that facilitate sending and receiving wireless radio-frequency signals, for example, based on instructions from a cell site. Radio 816 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, or apertures, or any combination thereof. The antennas may be capable of sending and receiving transmission via mmWaves, FD-MIMO, massive MIMO, 3G, 4G, 5G, or 802.11 protocols and techniques, etc.

Illustrative wireless telecommunications technologies that radio 816 may facilitate include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies or multiple radios can be utilized to support multiple technologies.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for a priority-based multi-user (MU) multiple-input multiple-output (MIMO) pairing threshold for codebook beamforming, the system comprising:
    an antenna array comprising one or more antenna elements; and
    one or more processors configured to execute operations comprising:
        identifying a plurality of user device candidates for a user device pairing, the plurality of user device candidates including a first user device, a second user device, and a third user device;
        determining that a second beam corresponding to the second user device of the plurality of user device candidates is less correlated to a first beam corresponding to the first user device than a third beam corresponding to the third user device; and
        based on determining that the second beam is less correlated to the first beam than the third beam, pairing the first user device with the second user device for sharing a resource.

2. The system according to claim 1, wherein the determination that the second beam is less correlated to the first beam than the third beam is based on a position of the first user device, a position of the second user device, and a position of the third user device.

3. The system according to claim 2, wherein the determination is further based on radio frequency measurements received by the first user device, the second user device, and the third user device.

4. The system according to claim 1, wherein the operations further comprise:
    determining whether a combined spectral efficiency of the first user device and the second user device is greater than a first individual spectral efficiency for the first user device and greater than a second individual spectral efficiency for the second user device; and
    upon determining that the combined spectral efficiency is greater than both the first individual spectral efficiency and the second individual spectral efficiency, pairing the first user device with the second user device.

5. The system according to claim 1, wherein the operations further comprise:
    identifying a fourth user device of the plurality of user device candidates having a lower priority than the first user device;
    determining a correlation threshold for the fourth user device based on the lower priority;
    determining that a correlation of the fourth user device with the second user device is below the correlation threshold;
    determining that a second correlation of the fourth user device with the first user device is below the correlation threshold; and
    based on determining that the correlation and the second correlation are below the correlation threshold, pairing the fourth user device with the first user device and the second user device for sharing the resource.

6. The system according to claim 1, wherein the resource comprises an uplink resource and a downlink resource.

7. The system according to claim 1, wherein the resource comprises a resource block.

8. The system according to claim 1, wherein the operations further comprise:
    receiving signal data from the first user device after pairing the first user device with the second user device for sharing the resource;
    determining a change to a radio frequency condition associated with the first user device based on the signal data; and
    based on determining the change, determining that the second beam is still less correlated to the first beam than the third beam.

9. A method for a priority-based multi-user (MU) multiple-input multiple-output (MIMO) pairing threshold for codebook beamforming, the method comprising:
    identifying a first user device, a second user device, and a third user device;
    determining that a second beam corresponding to the second user device is less correlated to a first beam corresponding to the first user device than a third beam corresponding to the third user device;
    determining that the correlation between the first beam and the second beam is below a threshold; and
    upon determining that the correlation is below the threshold, pairing the first user device with the second user device for sharing a resource.

10. The method according to claim 9, further comprising providing the resource to the first user device and the second user device.

11. The method according to claim 10, wherein the resource comprises a frequency band.

12. The method according to claim 9, wherein the threshold is determined based on the first user device utilizing a home mobile virtual network operator.

13. The method according to claim 9, wherein the threshold is determined based on enrollment of the first user device on a high-tiered service plan.

14. The method according to claim 9, wherein the threshold is determined based on the first user device being a voice-over-new-radio user device.

15. A system for a priority-based multi-user (MU) multiple-input multiple-output (MIMO) pairing threshold for codebook beamforming, the system comprising:
    an antenna array comprising one or more antenna elements; and
    a baseband processing unit comprising a digital signal processor and a scheduler, the baseband processing unit configured to execute operations comprising:
        identifying a plurality of user device candidates for a user device pairing, the plurality of user device candidates comprising a first user device and a second user device;
        determining whether a correlation of a first beam, associated with the first user device, with a second beam, associated with the second user device, is below a threshold; and based on determining that the correlation is below the threshold, pairing the first user device with the second user device for sharing a resource.

16. The system of claim 15, wherein the antenna array, the first beam, and the second beam are associated with a massive MIMO antenna.

17. The system of claim 15, further comprising:
determining whether a combined spectral efficiency of the first user device and the second user device is greater than a first individual spectral efficiency for the first user device and greater than a second individual spectral efficiency for the second user device; and
upon determining that the combined spectral efficiency is greater than both the first individual spectral efficiency and the second individual spectral efficiency, pairing the first user device with the second user device.

18. The system of claim 15, wherein the threshold is determined based on a network service plan of the first user device.

19. The system of claim 15, wherein the threshold is determined based on a quality of service of the first user device.

20. The system of claim 15, the operations further comprising scheduling, via the scheduler, an uplink and a downlink resource for the pairing.

\* \* \* \* \*